(No Model.)

2 Sheets—Sheet 1.

W. A. OBER.
TRUCK FOR HARVESTERS.

No. 330,258. Patented Nov. 10, 1885.

WITNESSES

INVENTOR
Wm. A. Ober:
By C. A. Snow & Co.
Attorneys (No Model.) 2 Sheets—Sheet 2.

W. A. OBER.
TRUCK FOR HARVESTERS.

No. 330,258. Patented Nov. 10, 1885.

WITNESSES

INVENTOR
W<sup>m</sup> A. Ober
per, Attorneys

UNITED STATES PATENT OFFICE.

WILLIAM A. OBER, OF NINE MILE, INDIANA.

TRUCK FOR HARVESTERS.

SPECIFICATION forming part of Letters Patent No. 330,253, dated November 10, 1885.

Application filed July 27, 1885. Serial No. 172,732. (No model.)

*To all whom it may concern:*

Be it known that I, WILLIAM A. OBER, a citizen of the United States, residing at Nine Mile, in the county of Allen and State of Indiana, have invented a new and useful Improvement in Trucks, of which the following is a specification, reference being had to the accompanying drawings.

My invention relates to a truck for transporting or moving a harvester or reaper of the platform class from one field or place to another; and the novelty consists in the construction, combination, and adaptation of the several parts for service, substantially as hereinafter fully set forth and claimed.

The object of my invention is to provide a truck or carriage which can be readily and quickly connected to or detached from the platform of a harvesting or reaping machine for transporting the same from one place or field to another, or along narrow or contracted roads, where the carrying-wheels of the harvester or reaper proper would be inoperative or liable to run down in ditches, &c., said truck being simple, strong, and durable in construction, and efficient in operation.

Figure 1:
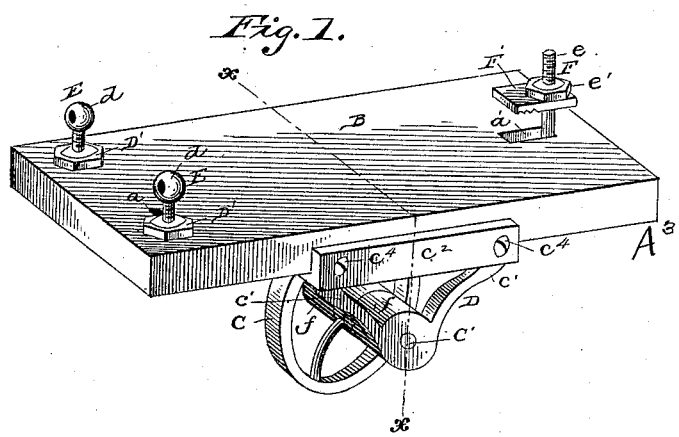
Figure 2:
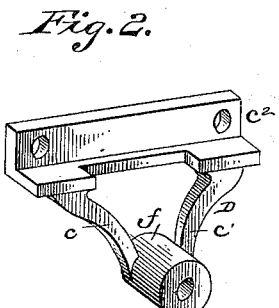
Figure 3:
Figure 4:
Figure 5:
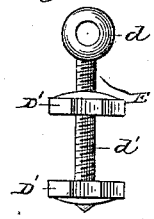
Figure 5:
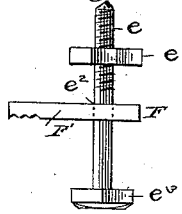
Figure 5:
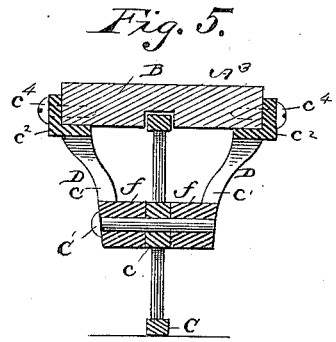
Figure 6:
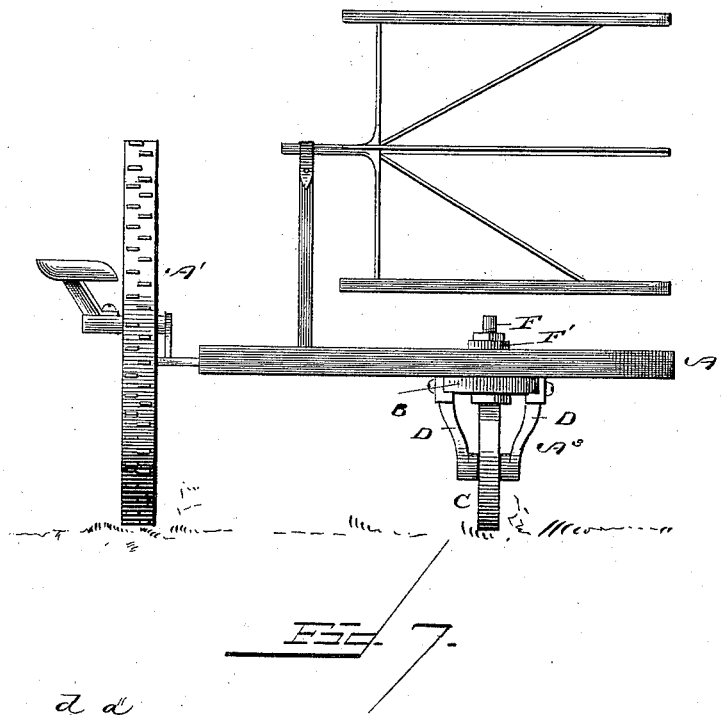
Figure 7:
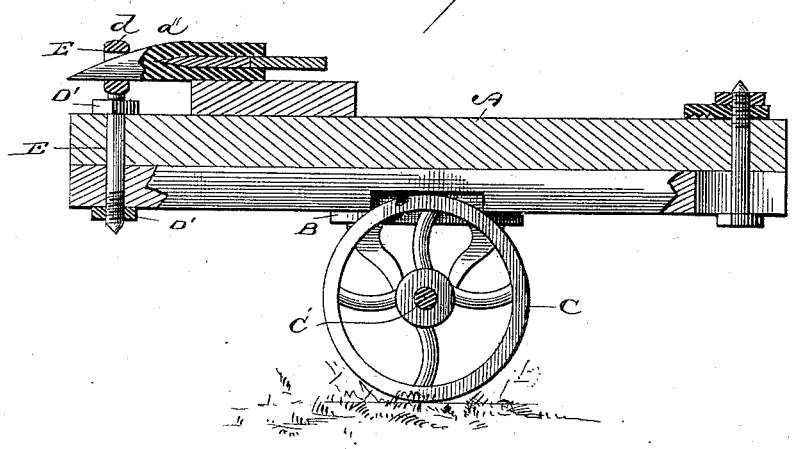

In the drawings hereto annexed, Figure 1 is a perspective view of my invention. Fig. 2 is a detail view of one of the supporting-hangers. Figs. 3 and 4 are detailed views of the securing-bolts for connecting the platform of the truck with the harvester-platform; and Fig. 5 is a longitudinal vertical sectional view on the line $x\,x$, Fig. 7. Fig. 6 is an end elevation of my improved truck in position beneath the harvesting-machine, a portion only of which is shown. Fig. 7 is an enlarged sectional view through the harvesting-machine platform with my improved truck in position beneath the same.

Like letters of reference indicate like parts in the several figures of the drawings.

Referring to the drawings, A designates a harvester-platform. $A^2$ designates the bearing-wheel thereof, and $A^3$ a truck constructed in accordance with my invention, and which consists, essentially, of a platform, B, a bearing-wheel, C, supporting-hangers D D, suspended from the platform, and fastening screw-bolts E E F, passed through the platform, at the ends thereof, and adapted to engage with the platform of harvester or reaping machine at its front and rear ends, as will be more fully described presently, and shown in Figs. 6 and 7 of the drawings.

The platform B is preferably made of wood and rectangular in form, the ends thereof projecting beyond the front and rear ends of the reaper-platform, under which the truck is placed at about the middle thereof. The front end of the platform B is provided with slots $a$ $a$, arranged transversely across the same, while the rear end of said platform is provided with a longitudinal slot, $a'$, at the middle.

The bolts E E pass through the slots $a$ $a$ at the front of the platform B, and at their upper ends said bolts are provided with eyes $d$ $d$, through which the guards or fingers $a''$ are passed, secured to the front end of the reaper-platform A. The lower portions of the bolts E E are screw-threaded, as at $d'$, and each bolt has two nuts, D' D', which bear on opposite sides of the platform A, and serve to secure the bolts in position. The bolts E are capable of a lateral adjustment toward or from each other in the slots $a$ $a$, to accommodate guards of different widths or positions. The bolt F passes through the slot $a'$ at the rear end of the platform B, and at its upper end it is screw-threaded, as at $e$, and carries a nut, $e'$, and a plate, F', the latter of which has an aperture or opening, $e^2$, adapted to fit over the upper end of the bolt loosely to permit the plate to slide freely thereon, the outer end of the plate being corrugated or serrated, which is adapted to bear firmly against the rear end of the reaper-platform A. The lower end of said bolt is headed, as at $e^3$, which bears against the under surface of the said platform, the bolt passing through the slot $a'$, and adjustable longitudinally therein to accommodate platforms of different widths.

It will be seen from the foregoing that the truck can be quickly and readily connected to and detached from the platform of a reaper or binder, to support the same in transporting the machine from one field or place to another, the grain-wheel of said platform being removed during the transportation of the machine, and that the truck is capable of adjustment to fit platforms of different widths.

Each of the hangers D D is provided with inwardly-projecting hubs $ff$, which are adapted to bear against the hub $c$ of a bearing-wheel, C, each of said hubs $f\ c$ having openings adapted to register with each other and form a bearing for the axle C', which passes through said openings. Each hanger comprises the hub $f$, two supporting-arms, $c'\ c'$, and a right-angled bearing-plate, $c^2$, all of said parts being preferably cast in one piece, the right-angled portion $c^2$ being adapted to fit against the edge of one side of the platform B, and secured thereto by bolts $c^4\ c^4$. The bearing-wheel C is of a diameter to elevate the platform of the truck and reaper at a height above the ground or road to clear rocks and other obstructions when transporting the machine. If desired, a slot or opening may be cut in the platform to permit of the passage of the wheel C therein.

The operation of my invention is as follows: The truck is placed under the platform of a harvesting or reaping machine, at or near the middle thereof, leaving the ends of said truck-platform projecting beyond the ends of the reaper or harvester platform. The eyes $d$ of the bolts E are then fitted over the points of two of the guard-fingers of the platform, and the nuts on said bolts tightened, thus clamping the front end of the platform B to the harvester-platform. The plate F' of the bolt F is then clamped against the upper surface of the rear end of the reaper-platform by tightening the nuts on said bolt F'. When the device is thus clamped to the reaper-platform, the grain-wheel on the extreme outer end thereof is removed, and the machine can be moved from place to place, power being applied to the draft-pole of the reaping-machine, as is usual.

My device is particularly useful when traveling narrow, contracted roads, and in crossing narrow bridges, the wheel C and bearing-wheel of the harvester or reaper being arranged alongside of and near to each other, and traveling in parallel planes when in motion.

In order to define the nature and scope of my invention, I would state that heretofore it has been proposed to construct a harvester-truck with two axles supported by bearing-wheels and connected together by reaches, the rear ends of which are adjustable laterally and longitudinally. In this truck the harvester or reaper is elevated bodily from the ground and supported wholly by the truck, which has a tongue for draft purposes, whereas in my device the truck is detachably secured to the reaper-platform at or near the middle thereof to elevate the grain-wheels above the ground and support the platform alone, the reaper-frame being supported by the bearing-wheel of the machine and drawn by the draft-pole of said reaper.

Having thus fully described my invention, what I claim, and desire to secure by Letters Patent, is—

1. In a harvester-truck, and in combination with the harvester-platform, a truck arranged beneath the same, and comprising a platform having adjustable securing-bolts at its ends, a bearing-wheel arranged below the truck-platform, and supporting-hangers depending from the platform, substantially as described.

2. In a harvester-truck, the combination of a platform, B, having slots $a\ a'$, hangers D D, depending from the platform, bearing-wheel C, mounted in the hangers, and bolts E F, substantially as described.

3. In a harvester-truck, the combination of a platform having transverse and longitudinal slots $a\ a'$, hangers D D, bolted to the platform and provided with hubs $ff$, a bearing-wheel, C, supported in the hangers, an axle, C', bolts E, having eyes $d$, and nuts $d'\ d'$, bolt F, having a nut, $e$, and a corrugated plate, E', arranged below the nut $e$ of the bolt E, and adapted to bear on the rear end of the harvester-platform, substantially as and for the purpose described.

In testimony that I claim the foregoing as my own I have hereto affixed my signature in presence of two witnesses.

WILLIAM A. OBER.

Witnesses:
CHARLES NICODEMUS,
JOHN A. MAIER.